US009047692B1

(12) United States Patent
Seitz et al.

(10) Patent No.: US 9,047,692 B1
(45) Date of Patent: Jun. 2, 2015

(54) SCENE SCAN

(71) Applicant: Google Inc., Mountain View, CA (US)

(72) Inventors: Steven Maxwell Seitz, Seattle, WA (US); Rahul Garg, Seattle, WA (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 13/721,607

(22) Filed: Dec. 20, 2012

Related U.S. Application Data

(60) Provisional application No. 61/577,931, filed on Dec. 20, 2011.

(51) Int. Cl.
*G06T 11/00* (2006.01)
*G06T 3/40* (2006.01)

(52) U.S. Cl.
CPC .............. *G06T 11/00* (2013.01); *G06T 3/4038* (2013.01)

(58) Field of Classification Search
CPC ......... G09G 5/14; G09G 5/363; G09G 5/393; G09G 2340/10; G09G 2340/125; G06F 3/0485; G06F 2200/1614; G06T 11/00; G06T 3/4038; G06T 11/60
USPC .......... 345/629, 619, 660, 672, 649; 382/284; 348/46
See application file for complete search history.

(56) References Cited

U.S. PATENT DOCUMENTS

| | | | | |
|---|---|---|---|---|
| 6,393,162 | B1 * | 5/2002 | Higurashi | 382/284 |
| 6,424,752 | B1 * | 7/2002 | Katayama et al. | 345/629 |
| 7,813,589 | B2 * | 10/2010 | Silverstein et al. | 382/284 |
| RE43,206 | E * | 2/2012 | Hsieh et al. | 345/629 |
| 8,139,084 | B2 * | 3/2012 | Kuroda | 345/619 |
| 2001/0010546 | A1 * | 8/2001 | Chen | 348/218 |
| 2003/0107586 | A1 * | 6/2003 | Takiguchi et al. | 345/629 |
| 2004/0062454 | A1 * | 4/2004 | Komiya et al. | 345/629 |
| 2005/0143136 | A1 * | 6/2005 | Lev et al. | 455/566 |
| 2007/0031062 | A1 * | 2/2007 | Pal et al. | 382/284 |
| 2009/0022422 | A1 * | 1/2009 | Sorek et al. | 382/284 |
| 2010/0020097 | A1 * | 1/2010 | Mai et al. | 345/629 |
| 2010/0097444 | A1 * | 4/2010 | Lablans | 348/46 |
| 2012/0207386 | A1 * | 8/2012 | Ofek et al. | 345/629 |

* cited by examiner

*Primary Examiner* — Chante Harrison
(74) *Attorney, Agent, or Firm* — Lerner, David, Littenberg, Krumholz & Mentlik, LLP

(57) ABSTRACT

Systems, methods, and computer storage mediums are provided for creating a scene scan from a group of photographic images. An exemplary method includes determining a set of common features for at least one pair of photographic images. The features include a portion of an object captured in each of a first and a second photographic image included in the pair. The first and second photographic images may be captured from different optical centers. A similarity transform for the at least one pair of photographic images is the determined. The similarity transform is provided in order to render the scene scan from each pair of photographic images. At least one of the rotation factor, the scaling factor, or the translation factor associated with the similarity transform is used to position each pair of photographic images such that the set of common features between a pair of, at least in part, align.

14 Claims, 8 Drawing Sheets

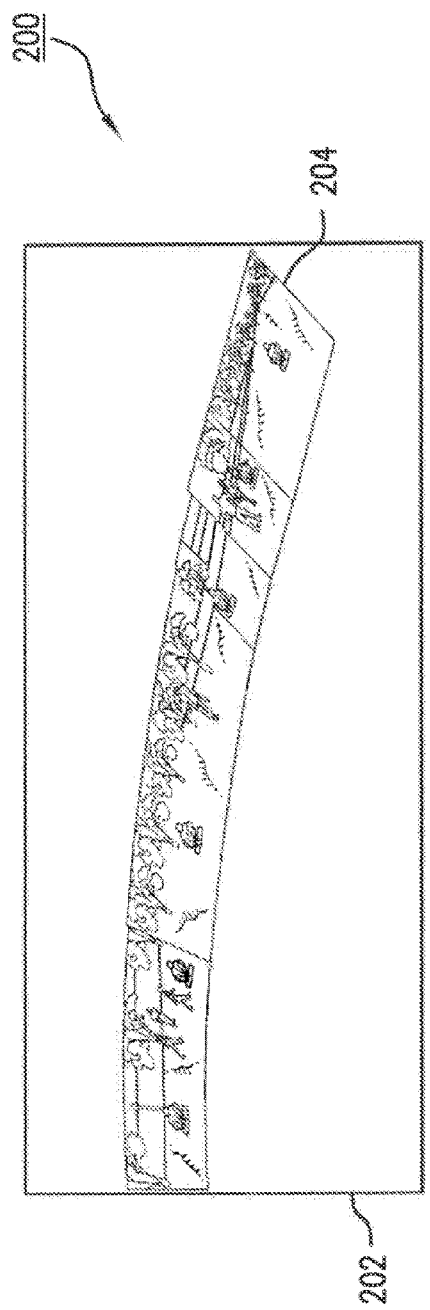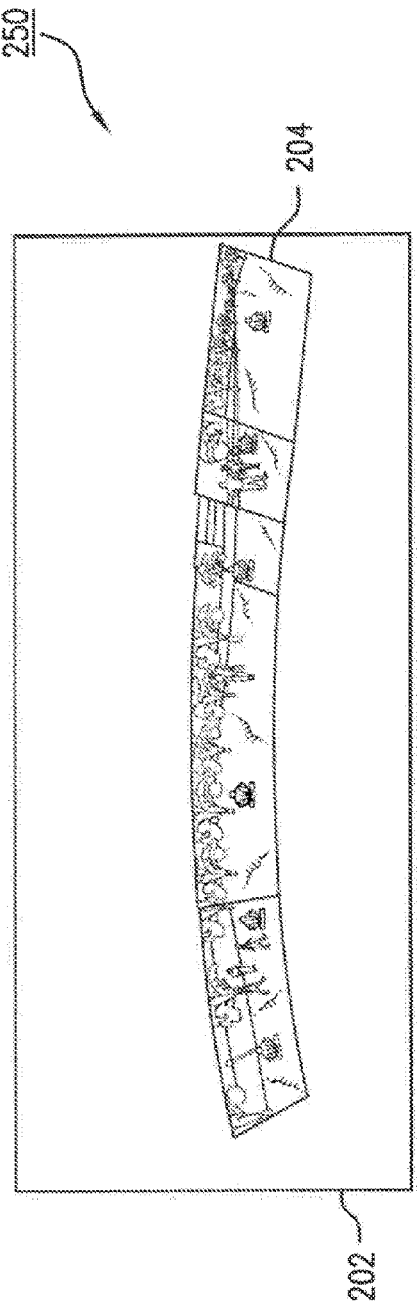
FIG. 2A
FIG. 2B

SCENE SCAN

This application claims the benefit of U.S. Provisional Application No. 61/577,931 filed Dec. 20, 2011, which is incorporated herein in its entirety by reference.

FIELD

The embodiments described herein generally relate to organizing photographic images.

BACKGROUND

Users wishing to stitch together a collection of photographic images captured from the same optical center may utilize a variety of computer programs that determine a set of common features in the photographic images and stitch the photographic images together into a single panorama. The photographic images may be aligned by matching the common features between the photographic images. These computer programs, however, are not designed to stitch photographic images together when the photographic images are captured from different optical centers. Panorama creation programs known in the art require that an image capture device rotate about the optical center of its lens, thereby maintaining the same point of perspective for all photographs. If the image capture device does not rotate about its optical center, its images may become impossible to align perfectly. These misalignments are called parallax error.

BRIEF SUMMARY

The embodiments described herein include systems, methods, and computer storage mediums for creating a scene scan from a group of photographic images. A method includes determining a set of common features for at least one pair of photographic images from the group of photographic images. The set of common features includes at least a portion of an object captured in each of a first and second photographic image included in the at least one pair of photographic images, where the first and second photographic images may be captured from different optical centers.

A similarity transform for the at least one pair of photographic images is then determined. The similarity transform includes a rotation factor between the first and second photographic images. The rotation factor describes a rotation that, when applied to the first or second photographic image, aligns, at least in part, the set of common features between the first and second photographic images. The similarity transform also includes a scaling factor between the first and second photographic images. The scaling factor describes a zoom level that, when applied to the first or second photographic image, aligns, at least in part, the set of common features between the first and second photographic images. The similarity transform further includes a translation factor between the first and second photographic images. The translation factor describes a change in position that, when applied to the first or second photographic image, aligns, at least in part, the set of common features between the first and second photographic images.

The similarity transform is then provided in order to render the scene scan from the at least one pair of photographic images. At least one of the rotation factor, the scaling factor, or the translation factor associated with the similarity transform is used to position the first and second photographic images such that the set of common features between the first and second photographic images, at least in part, align.

Further features and advantages of the embodiments described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

FIG. 2A illustrates a scene scan with a rotation bias according to an embodiment.

FIG. 2B illustrates the scene scan in FIG. 2A with a counter rotation applied according to an embodiment.

DETAILED DESCRIPTION

Embodiments described herein may be used to create a scene scan from a group of photographic images. The photographic images utilized by the embodiments may include photographic images captured from different optical centers. A first photographic image captured from a first optical center may be different from a second photographic image captured from a second optical center when, for example, the first and second photographic images are captured from different locations. To position photographic images captured from different optical centers, a set of common features are detected between the photographic images. If a set of common features is located, a similarity transform is determined such that, when it is applied to at least one photographic images, the set of common features align. The similarity transform may be provided with the photographic images and used to render the photographic images on a display device.

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate example embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

This Detailed Description is divided into sections. The first section describes example scene scans that may be rendered by the embodiments. The second and third sections describe example system and method embodiments, respectively, that may be used to render a scene scan from a collection of photographic images. The fourth section describes an example computer system that may be used to implement the embodiments described herein.

Example Scene Scans

Figure 1:
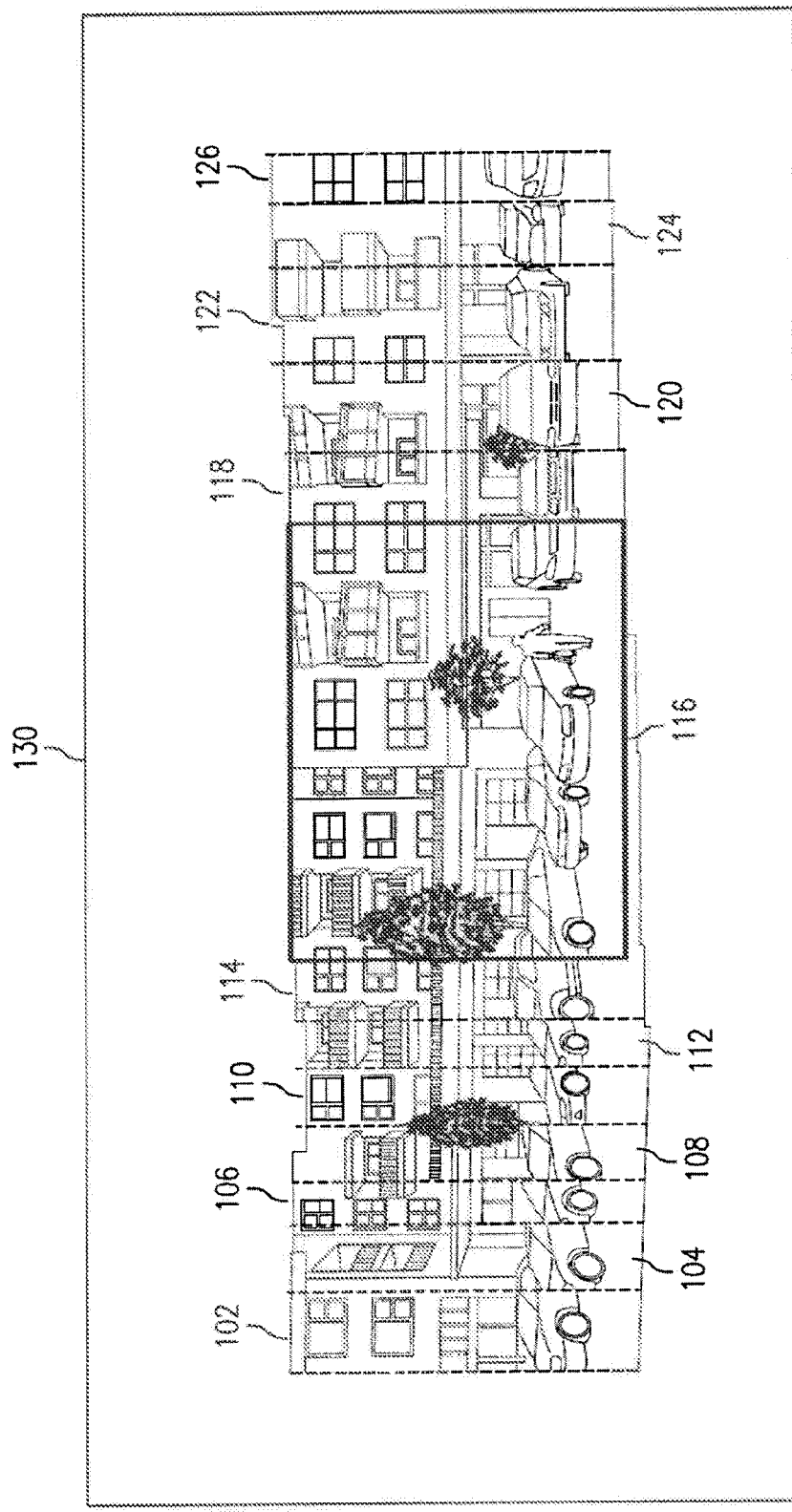
FIG. 1 illustrates a scene scan according to an embodiment.

FIG. 1 illustrates a scene scan 100 according to an embodiment. Scene scan 100 is created by overlaying photographic images 102, 104, 106, 108, 110, 112, 114, 116, 118, 120, 122, 124, and 126 on top of each other. Photographic images 102-126 are each captured from a different optical center. In scene scan 100, the optical center used to capture each photographic image 102-126 changes in a horizontal direction as each image is captured. As a result, scene scan 100 shows a scene that is created by aligning each photographic image 102-126 based on common features captured in neighboring photographic images.

To create scene scan 100, photographic images 102-126 are each positioned on top of one another based on the common features found between each pair. For example, photographic images 114 and 116 each capture a portion of the same building along a street. This common building may be detected by a system configured to create scene scans such as, for example, system 400 in FIG. 4 or system 500 in FIG. 5. Once common features are identified between photographic images 102-126, scene scan 100 may be rendered by positioning photographic images 102-126 such that the common features align. In scene scan 100, common features exist between photographic images 102 and 104, photographic images 104 and 106, photographic images 106 and 108, photographic images 108 and 110, etc.

Scene scan 100 may be rendered to display on a display device such that the photographic image with an image center closest to the center of a viewport is placed on top. In FIG. 1, the image center of photographic image 116 is closest to the center of viewport 130 and thus, photographic image 116 is displayed on top of photographic images 102-114 and 118-126. A user interface may be utilized to that allows a user to interact with scene scan 100. The user interface may allow a user to, for example, pan or zoom scene scan 100. If the user selects to pan scene scan 100, the photographic image with the image center closest to the center of viewport 130 may be moved to the top of the rendered photographic images. For example, if a user selects to pan along scene scan 100 to the left of photographic image 116, photographic image 114 may be placed on top of photographic image 116 when the image center of photographic image 114 is closer to the center of viewport 130 than the image center of photographic image 116.

FIG. 2A illustrates scene scan 200 with a rotation bias according to an embodiment. Similar to scene scan 100, scene scan 200 includes photographic images 204 arranged such that the features that are common between at least two photographic images align. Scene scan 200 is displayed through viewport 202. Photographic images 204 are aligned with a rotation bias showing a downward direction. The rotation bias is due to one or more photographic images 204 having a stitching plane that is not parallel to the image plane. The rotation bias can occur when, for example, two photographic images are captured from different rotation angles about a capture devices optical axes.

FIG. 2B illustrates scene scan 250 that shows scene scan 200 in FIG. 2A with a counter rotation applied. Scene scan 250 is rendered with the counter rotation to counter-act the rotation bias in scene scan 200. The counter rotation may be determined based on, for example, photographic images 204 shown in viewport 202. In some embodiments, the counter rotation is based on a rotation factor and a weight factor associated with each photographic image 204 displayed in viewport 202. The rotation factor is determined based on, for example, aligning common features between the photographic images. The weight factor may be based on, for example, the distance between the image center of a photographic image and the center of viewport 202. The rotation factor and the weight factor may be combined to determine the counter-rotation.

Figure 3A:
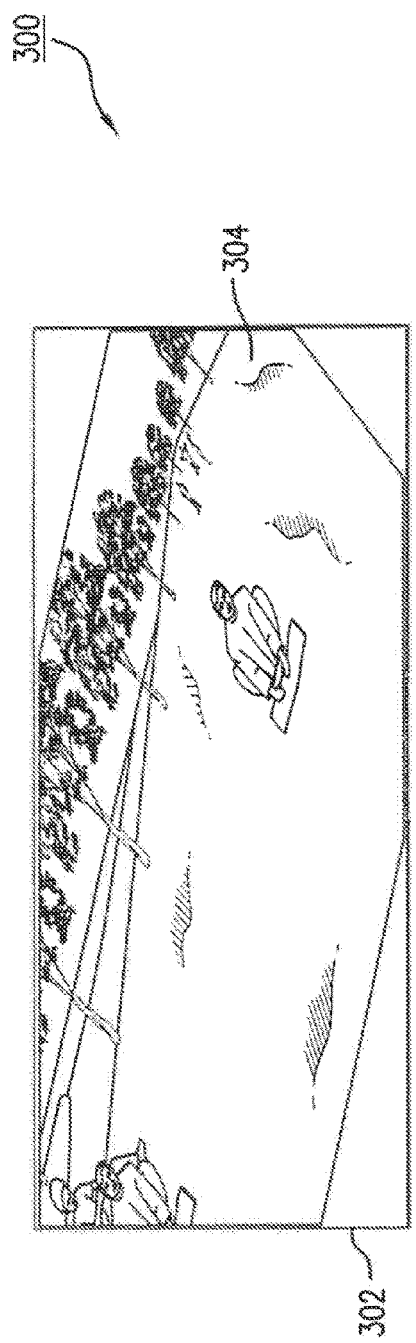
FIG. 3A illustrates a scene scan with a rotation bias where a viewport set to zoom in the scene scan according to an embodiment.

FIG. 3A illustrates scene scan 300 with a rotation bias according to an embodiment. Scene scan 300 is similar to scene scan 200 in FIG. 2A except that viewport 302 is zoomed into photographic images 304. Photographic images 304 are aligned with a rotation bias showing a downward direction. The rotation bias is due to one or more photographic images 304 having a stitching plane that is not parallel to the image plane. The rotation bias occurs because, for example, at least two photographic images 304 are captured from different rotation angles about a capture device's optical axis.

Figure 3B:
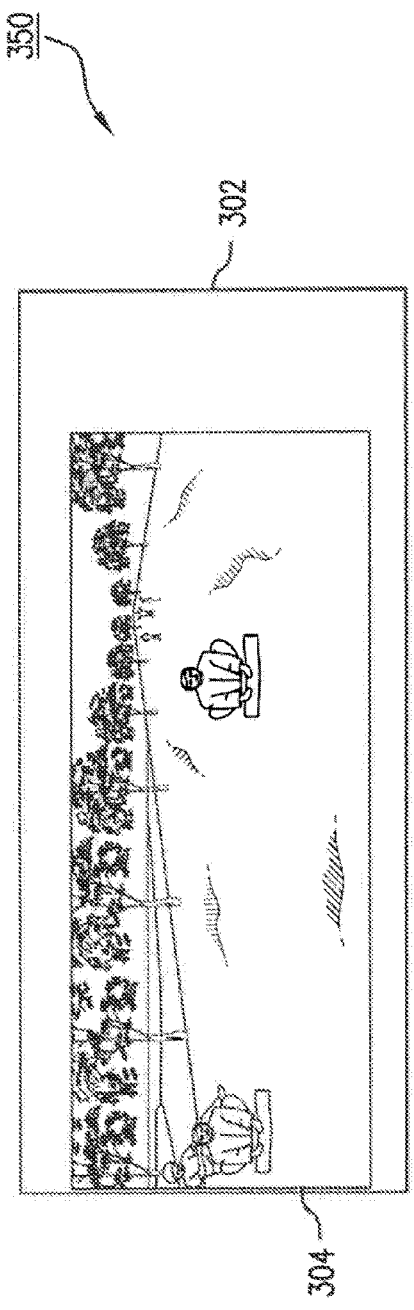
FIG. 3B illustrates the scene scan in FIG. 3A with a counter rotation applied according to an embodiment.

FIG. 3B illustrates scene scan 350 that shows scene scan 300 in FIG. 3A with a counter rotation applied. Scene scan 350 is rendered with the counter rotation to counter-act the rotation bias in scene scan 300. The counter rotation for scene scan 300 is determined based on photographic images 304 shown in viewport 302. The counter rotation is based on a rotation factor and a weight factor associated with each photographic image 304 displayed in viewport 302. In scene scan 350, the weight factor is determined for each photographic image 304 by finding the distance between the image center of a photographic image in viewport 302 and the center of viewport 302. The rotation factor corresponds to the rotation used to align common features between photographic images 304. Once the counter rotation is determined for the photographic images 304 in viewport 302, the counter rotation is applied by rotating photographic images 304 in a direction opposite to the rotation bias.

FIGS. 1, 2A, 2B, 3A, and 3B are provided as examples and are not intended to limit the embodiments described herein.

Example System Embodiments

Figure 4A:
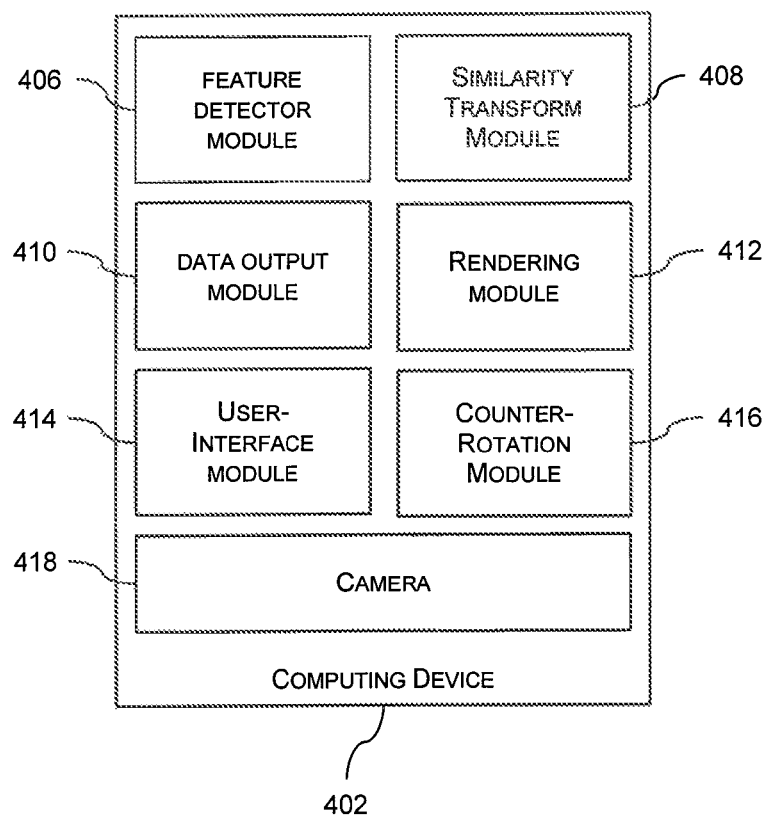
FIG. 4A illustrates an example system for creating a scene scan from a group of photographic images according to an embodiment.

FIG. 4A illustrates an example system 400 for creating a scene scan from a group of photographic images according to an embodiment. System 400 includes computing device 402. Computing device 402 includes feature detector module 406, similarity transform module 408, data output module 410, rendering module 412, user-interface module 414, counter-rotation module 416, and camera 418.

Figure 4B:
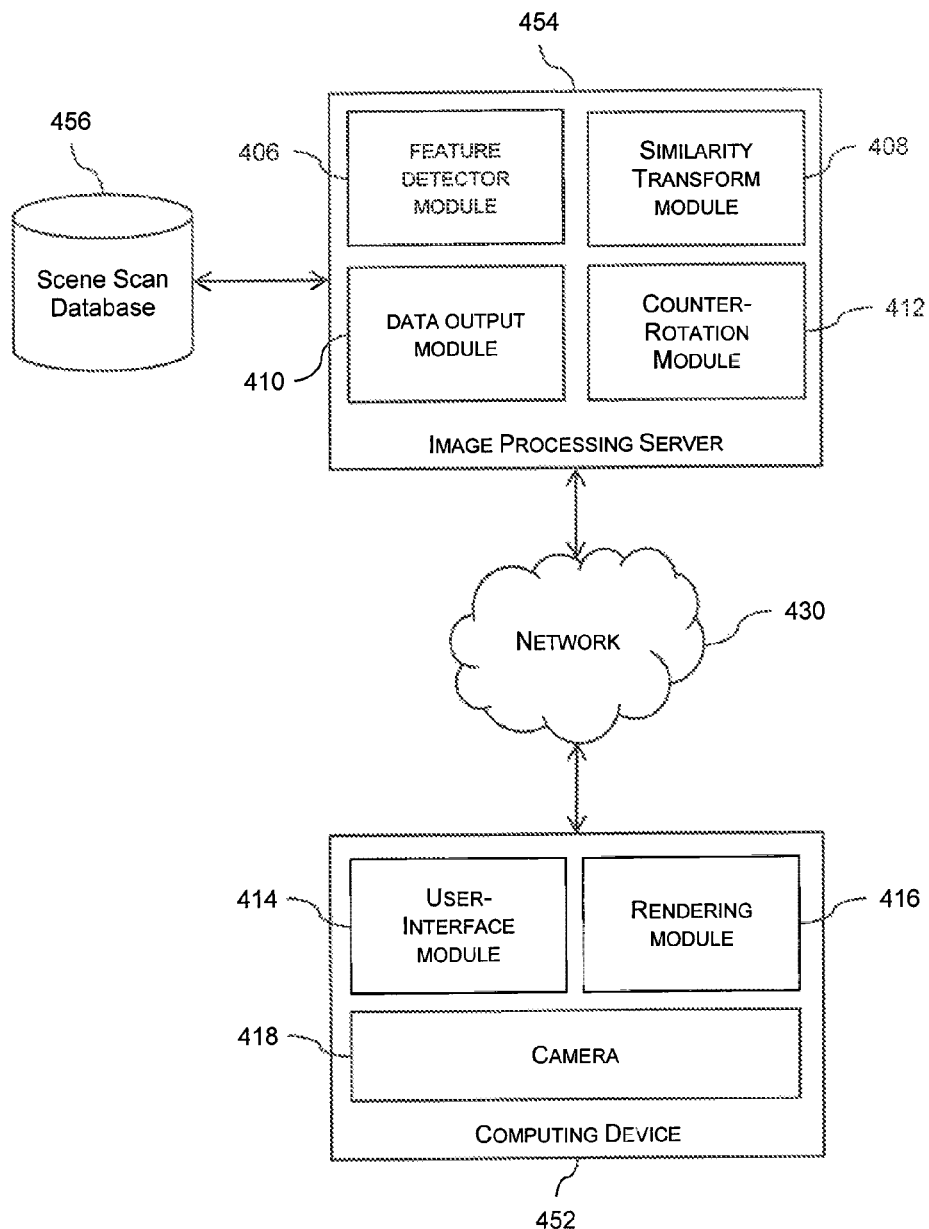
FIG. 4B illustrates an example system for creating a scene scan from a group of photographic images comprising according to an embodiment.

FIG. 4B illustrates an example system 450 for creating a scene scan from a group of photographic images according to an embodiment. System 450 is similar to system 400 except that some functions are carried out by a server. System 450 includes computing device 452, image processing server 454, scene scan database 456 and network 430. Computing device 452 includes rendering module 412, user-interface module 414, and camera 418. Image processing server 454 includes feature detector module 406, similarity transform module 408, data output module 410, and counter-rotation module 416.

Computing devices 402 and 452 can be implemented on any computing device capable of processing photographic images. Computing devices 402 and 452 may include, for example, a mobile computing device (e.g. a mobile phone, a smart phone, a personal digital assistant (PDA), a navigation device, a tablet, or other mobile computing devices). Computing devices 402 and 452 may also include, but are not limited to, a central processing unit, an application-specific integrated circuit, a computer, workstation, a distributed computing system, a computer cluster, an embedded system, a stand-alone electronic device, a networked device, a rack server, a set-top box, or other type of computer system having at least one processor and memory. A computing process performed by a clustered computing environment or server farm may be carried out across multiple processors located at the same or different locations. Hardware can include, but is not limited to, a processor, memory, and a user interface display.

Computing devices 402 and 452 each include camera 418. Camera 418 may include any digital image capture device such as, for example, a digital camera or an image scanner. While camera 418 is included in computing devices 402 and 452, camera 418 is not intended to limit the embodiments in any way. Alternative methods may be used to acquire photographic images such as, for example, retrieving photographic images from a local or networked storage device.

Network 430 can include any network or combination of networks that can carry data communication. These networks can include, for example, a local area network (LAN) or a wide area network (WAN), such as the Internet. LAN and WAN networks can include any combination of wired (e.g., Ethernet) or wireless (e.g., Wi-Fi, 3G, or 4G) network components.

Image processing server 454 can include any server system capable of processing photographic images. Image processing server 454 may include, but is not limited to, a central processing unit, an application-specific integrated circuit, a computer, workstation, a distributed computing system, a computer cluster, an embedded system, a stand-alone electronic device, a networked device, a rack server, a set-top box, or other type of computer system having at least one processor and memory. A computing process performed by a clustered computing environment or server farm may be carried out across multiple processors located at the same or different locations. Hardware can include, but is not limited to, a processor, memory, and a user interface display. Image processing server 454 may process photographic images into scene scans and store the scene scan information on scene scan database 456. Scene scans stored on scene scan database 456 may be transmitted to computing device 452 for display.

A. Feature Detector Module

Feature detector module 406 is configured to determine a set of common features for at least one pair of photographic images from a group of photographic images. The pair of photographic images may include any two photographic images from the group of photographic images. Additionally, feature detector module 406 may detect a set of common features between multiple pairs of photographic images.

The set of common features include at least a portion of an object captured in each photographic image in the pair of photographic images, where each photographic image may be captured from a different optical centers. The set of common features may include, for example, an outline of a structure, intersecting lines, or other features captured in the photographic images. Feature detector module 406 may utilize any number of feature detection method known to those of skill in the art such as, for example, Features from Accelerated Segment Test ("FAST"), Speed Up Robust Features ("SURF"), or Scale-invariant feature transform ("SIFT"). In some embodiments, two features are determined between the photographic images. Other features are then determined and used to verify that the photographic images captured, at least a portion, of the same subject matter.

In some embodiments, the set of common features is determined for a pair of photographic images as the photographic images are being captured by computing devices 402 or 452. In some embodiments, as a new photographic image is captured, a set of common features is determined between the newly captured photographic image and the next most recently captured photographic image. In some embodiments, the set of common features is determined between the newly captured photographic image and a previously captured photographic image.

B. Similarity Transform Module

Once a set of common features is determined for a pair of photographic images, similarity transform module 408 is configured to determine a similarity transform for the pair photographic images. The similarity transform is determined by calculating a rotation factor, a scaling factor, and a translation factor that, when applied to each or all of the photographic images in the pair, align the set of common features between photographic images in the pair.

1. Rotation Factor

Similarity transform module 408 is configured to determine a rotation factor between a first and second photographic image in the pair. The rotation factor describes a rotation that, when applied to either or both of the first and second photographic images, aligns, at least in part, the set of common features between the first and second photographic images. The rotation factor may be determined between the first and second photographic images when, for example, the first and second photographic images are captured about parallel optical axes but at different rotation angels applied to each optical axis. For example, if the first photographic image is captured at an optical axis and at a first angle of rotation and the second photographic image is captured at a parallel optical axis but at a second angle of rotation, the image planes of the first and second photographic images may not be parallel. If the image planes are not parallel, the rotation factor may be used to rotate either or both of the photographic images such that the set of common features, at least in part, align. For example, if the rotation factor is applied to the second photographic image, the set of common features will align, at least in part, when the set of common features appear at approximately the same rotation angel.

2. Scaling Factor

Similarity transform module 408 is also configured to determine a scaling factor between the first and second photographic images in the pair. The scaling factor describes a zoom level that, when applied to either or both of the first and second photographic images, aligns, at least in part, the set of common features between the first and second photographic images. For example, if the set of common features between the first and second photographic images are at different levels of scale, the set of common features between the photographic images may appear at different sizes. The scale factor may be determined such that, when the scale factor is applied to either or both of the first and second photographic images, the set of common features are approximately at the same level of scale.

3. Translation Factor

Similarity Transform module 408 is also configured to determine a translation factor between the first and second photographic images in the pair. The translation factor describes a change in position that, when applied to either or both of the first and second photographic images, aligns, at least in part, the set of common features between the first and second photographic images. For example, in order to align the set of common features between the first and second photographic images, the photographic images may be positioned such that the set of common features overlap. The translation factor determines, for example, the horizontal and vertical (e.g., x and y) coordinates that, when applied to either or both of the photographic images, positions the photographic images such that the set of common features overlap. The translation factor may utilize other coordinate systems such as, for example, latitude/longitude or polar coordinates.

C. Data Output Module

Data output module 410 is configured to output the similarity transform for each pair of photographic images in order to render the scene scan. Each of the rotation factor, the scaling factor, and the translation factor may be used to render a scene scan from each pair of photographic images. For example, each of the rotation factor, the scaling factor, or the translation factor may be used to position a first and second photographic image in a pair such that the set of common features between the first and second photographic images, at least in part, align. Each of the rotation factor, scaling factor, and translation factor may be output separately or combined into a single data value such as, for example, a matrix.

In some embodiments, the rotation, scaling, and translation factors are output to scene scan database 456. The factors may then be retrieved by a user along with the corresponding photographic images so that a scene scan can be rendered on a computing device. In some embodiments, the factors may be determined by computing device 402 and output to a database such as, for example, scene scan database 452. Scene scans output to scene scan database 456 may be associated with a user profile and shared with one or more other users, or made publicly available to all users.

D. Rendering Module

Rendering module 416 is configured to render a scene scan such that each pair of photographic images is positioned to align the set of common features between a first and second photographic image included in a pair. The set of common features between the first and second photographic images is aligned using at least one of the rotation factor, the scaling factor, or the translation factor. In some embodiments, the scene scan is rendered by stitching the photographic images together and displaying the stitched photographic images. In some embodiments, each photographic image is maintained separately and positioned on top of each other such that the set of common features between the photographic images align.

In some embodiments, rendering module 416 is also configured to apply the counter-rotation, at least in part, to at least one photographic image. The counter rotation, described below, rotates, for example, a photographic image in a direction opposite to the rotation factor in order to counter-act the rotation bias resulting from the rotation factor. The counter-rotation may instead be applied to the scene scan or a portion of the scene scan. In some embodiments, the portion of the scene scan for which the counter-rotation is applied may correspond to the portion of the scene scan displayed through a viewport. The viewport defines a window that is displayed on a display device.

E. Counter-Rotation Module

Counter rotation module 412 is configured to determine a counter rotation for the scene scan. The counter-rotation, when applied to at least one photographic image, adjust the photographic image such that the photographic image displays with a smaller rotation bias. The counter rotation is based on the rotation factor and a weight factor associated with each photographic image. The weight factor is based on a distance between an image center of a photographic image and the center of the viewport. In some embodiments, the counter-rotation is determined from the following equation:

$$w_1 \times r_1 + w_2 \times r_2 + w_3 \times r_3 \ldots w_n \times r_n$$

In the equation, 'w' represents that weight factor associated with each photographic image in the viewport and 'r' represents the rotation factor associated with each photographic image in the viewport. Once the counter-rotation is determined, it is applied to at least one photographic image within the viewport. In some embodiments, the counter-rotation is determined separately for each photographic image. Examples illustrations showing counter-rotations applied to the photographic images in a scene scan may be found in FIGS. 2B and 3B.

F. User-Interface Module

In some embodiments, user-interface module 414 is configured to display at least a portion of the scene scan that falls within a viewport used to display the rendered photographic images. The viewport is a window or boundary that defines the area that is displayed on a display device. The viewport may be configured to display all or a portion of a scene scan or may be used to zoom or pan the scene scan.

In some embodiments, user-interface module 414 may also be configured to receive user input to navigate through the scene scan. The user input may include, for example, commands to pan through the photographic image, change the order of the overlap between photographic images, zoom into or out of the photographic images, or select portions to the scene scan to interact with.

In some embodiments, the photographic image displayed on top may be determined based on the distance between the image center of a photographic image and the center of the viewport. For example, when the image center of a first photographic image is closest to the center of a viewport used to display the scene scan, user-interface module 414 may be configured to position the first photographic image over a second photographic image. Similarly, when the image center of the second photographic image is closest to the center of the viewport used to display the scene scan, user-interface module 414 may be configured to position the second photographic image over the first photographic image. In some embodiments the order of overlap between the photographic images included in the scene scan is determined as the user navigates through the scene scan.

In some embodiments, user-interface module 414 is configured to position each photographic image such that the photographic image with the image center closest to the center of a viewport is placed over the photographic image with the image center next closest to the center of the viewport. For example, if a first photographic image has an image center closest to the center of the viewport, user-interface module 414 may be configured to place the first photographic image on top of all other photographic images in the scene scan.

Similarly, if a second photographic image has an image center next closest to the center of the viewport, the second photographic image may be positioned over all but the first photographic image.

Various aspects of embodiments described herein can be implemented by software, firmware, hardware, or a combination thereof. The embodiments, or portions thereof, can also be implemented as computer-readable code. The embodiment in systems 400 and 450 are not intended to be limiting in any way.

Example Method Embodiments

Figure 5:
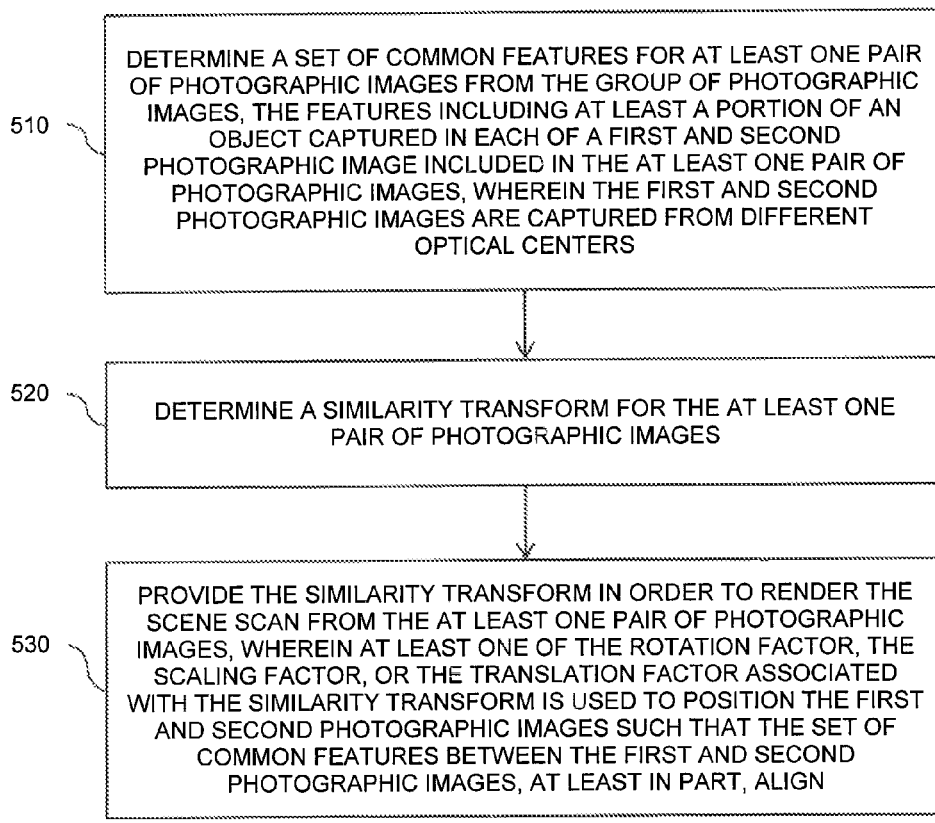
FIG. 5 is a flowchart illustrating a method that may be used to create a scene scan from a group of photographic images according to an embodiment.

FIG. 5 is a flowchart illustrating a method 500 that may be used to create a scene scan from a group of photographic images according to an embodiment. While method 500 is described with respect to an embodiment, method 500 is not meant to be limiting and may be used in other applications. Additionally, method 500 may be carried out by, for example, system 400 in FIG. 4A or system 450 in FIG. 4B.

Method 500 first determines a set of common features for at least one pair of photographic images included in the group of photographic images (stage 510). The set of common features includes at least a portion of an object captured in each of a first and a second photographic image included in the at least one pair, where the first and second photographic images may be captured from different optical centers. Any feature detection method may be used to determine the set of common features for the photographic images included in a pair. Such methods may include, for example, Features from Accelerated Segment Test ("FAST"), Speed Up Robust Features ("SURF"), or Scale-invariant feature transform ("SIFT"). These feature detection methods are merely provided as examples and are not intended to limit the embodiments in any way. Stage 510 may be carried out by, for example, feature detector module 406 embodied in systems 400 and 450.

Method 500 then determines a similarity transform for the at least one pair of photographic images (stage 520). The similarity transform includes determining a rotation factor, a scaling factor, and a translation factor between at least the first and second photographic images included in the pair. The similarity factor, when applied to either or both of the first and second photographic images, may be used to align the set of common features between the first and second photographic images.

The rotation factor describes a rotation that, when applied to at least one of the first or second photographic images, aligns, at least in part, the set of common features between the first and second photographic images. The scaling factor describes a zoom level that, when applied to either or both of the first and second photographic images, aligns, at least in part, the set of common features between the first and second photographic images. The translation factor describes a change in position that, when applied to either or both of the first and second photographic images, aligns, at least in part, the set of common features between the first and second photographic images. Stage 520 may be carried out by, for example, similarity transform module 408 embodied in systems 400 and 450.

Method 500 also provides the similarity transform in order to render the scene scan from the at least one pair of photographic images (stage 530). At least one of the rotation factor, the scaling factor, or the translation factor may be used to position the first and second photographic images included in each pair such that the set of common features between the first and second photographic images, at least in part, align. In some embodiments, the scene scan may be rendered in a viewport and displayed on a display device. Stage 530 may be carried out by, for example, data output module 410 embodied in systems 400 and 450.

Figure 6:
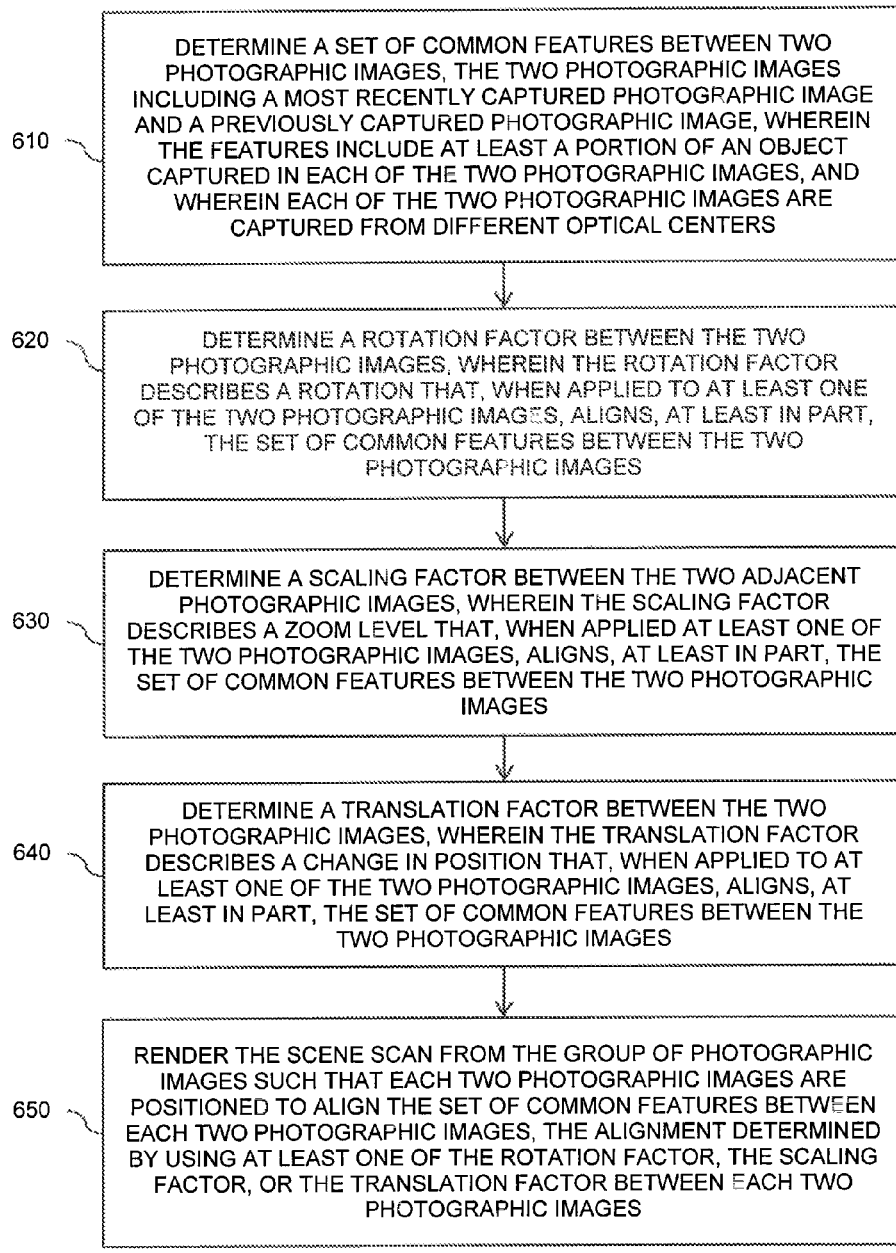
FIG. 6 is a flowchart illustrating a method that may be used to create a scene scan from a group of photographic images according to an embodiment.

FIG. 6 is a flowchart illustrating a method 600 that may be used to create a scene scan from a group of photographic images. The group of photographic images may be organized according to a time value associated with each photographic. The time value may indicate when each photographic image was captured. While method 600 is described with respect to an embodiment, method 600 is not meant to be limiting and may be used in other applications. Additionally, method 600 may be carried out by, for example, system 400 in FIG. 4A or system 450 in FIG. 4B.

Method 600 first determines a set of common features between two photographic images (stage 610). The two photographic images include a most recently captured photographic image and a previously captured photographic image. The features include at least a portion of an object captured in each of the two photographic images, where each of the two photographic images may be captured from different optical centers. Any feature detection method may be used to determine the set of common features between the photographic images. Such methods may include, for example, Features from Accelerated Segment Test ("FAST"), Speed Up Robust Features ("SURF"), or Scale-invariant feature transform ("SIFT"). These feature detection methods are merely provided as examples and are not intended to limit the embodiments in any way. Stage 610 may be carried out by, for example, feature detector module 406 embodied in systems 400 and 450.

Method 600 then determines a rotation factor between the two photographic images (stage 620). The rotation factor describes a rotation that, when applied to at least one of the two photographic images, aligns, at least in part, the set of common features between the two photographic images. Stage 620 may be carried out by, for example, similarity transform module 408 embodied in systems 400 and 450.

Method 600 then determines a scaling factor between the two adjacent photographic images (stage 630). The scaling factor describes a zoom level that, when applied at least one of the two photographic images, aligns, at least in part, the set of common features between the two photographic images. Stage 630 may be carried out by, for example, similarity transform module 408 embodied in systems 400 and 450.

Method 600 then determines a translation factor between the two photographic images (stage 640). The translation factor describes a change in position that, when applied to at least one of the two photographic images, aligns, at least in part, the set of common features between the two photographic images. Stage 640 may be carried out by, for example, similarity transform module 408 embodied in systems 400 and 450.

Method 600 finally renders the scene scan from the group of photographic images such that each two photographic images are positioned to align the set of common features between them (stage 650). The alignment is determined by using at least one of the rotation factor, the scaling factor, or the translation factor. In some embodiments, the scene scan may be rendered in a viewport and displayed on a display device. Stage 650 may be carried out by, for example, rendering module 416 embodied in systems 400 and 450.

Example Computer System

Figure 7:
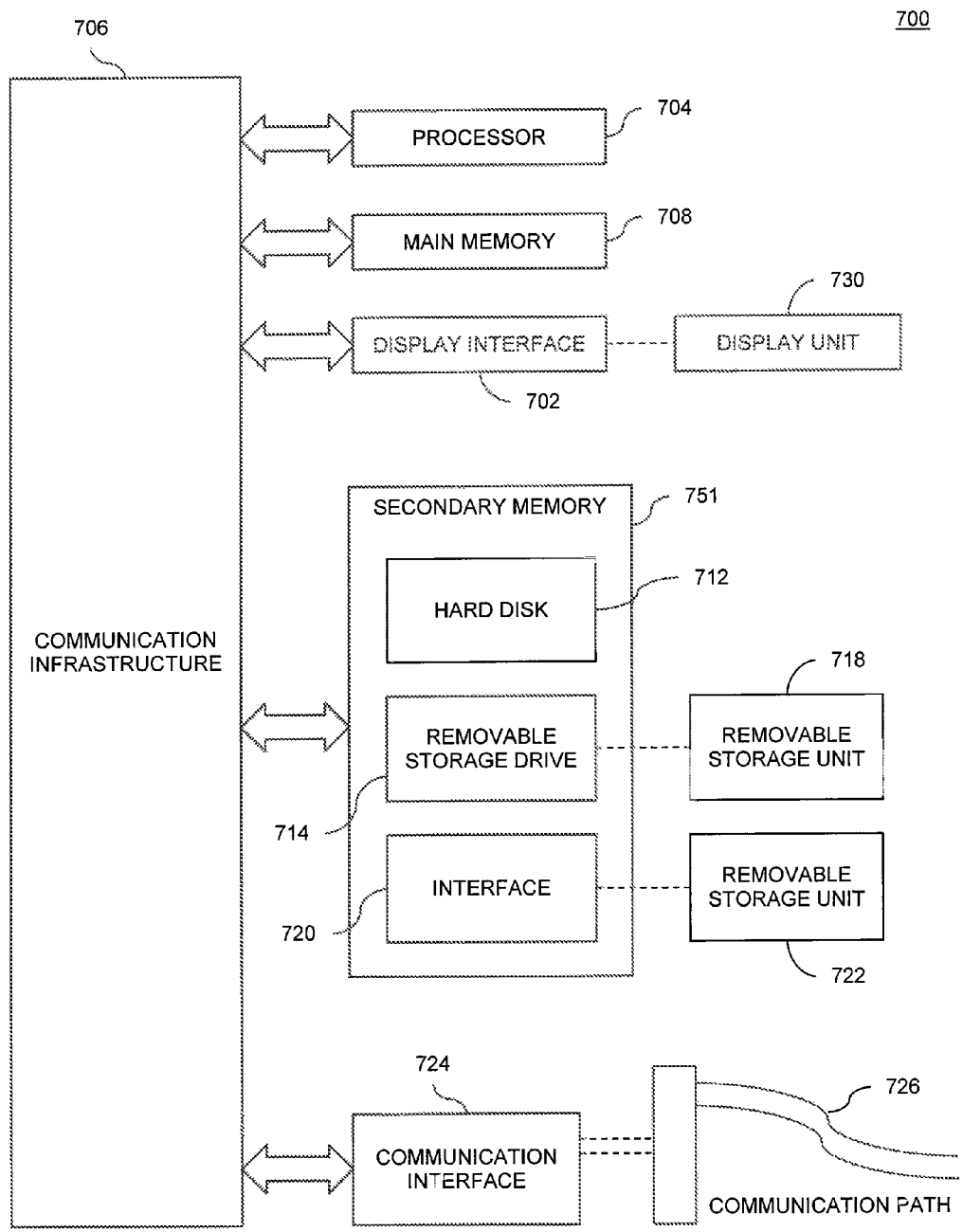
FIG. 7 illustrates an example computer in which the embodiments described herein, or portions thereof, may be implemented as computer-readable code.

FIG. 7 illustrates an example computer 700 in which the embodiments described herein, or portions thereof, may be implemented as computer-readable code. For example, feature detector module 406, image rotation module 408, image scaling module 410, image translation module 412, data output module 414, rendering module 416, user-interface module 418, or counter-rotation module 420 may be implemented in one or more computer systems 700 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 704 may be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme. Computer system 700 may also include display interface 702 and display unit 730.

Computer system 700 also includes a main memory 708, for example, random access memory (RAM), and may also include a secondary memory 710. Secondary memory 710 may include, for example, a hard disk drive 712, and removable storage drive 714. Removable storage drive 714 may include a floppy disk drive, a magnetic tape drive, an optical disk drive, a flash memory drive, or the like. The removable storage drive 714 reads from and/or writes to a removable storage unit 718 in a well-known manner. Removable storage unit 718 may include a floppy disk, magnetic tape, optical disk, flash memory drive, etc. which is read by and written to by removable storage drive 714. As will be appreciated by persons skilled in the relevant art, removable storage unit 718 includes a computer readable storage medium having stored thereon computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 718, removable storage unit 722, and a hard disk installed in hard disk drive 712. Computer storage medium and computer readable storage medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement the embodiments described herein. In particular, the computer programs, when executed, enable processor device 704 to implement the processes of the embodiments, such as the stages in the methods illustrated by flowchart 500 of FIG. 5 and flowchart 600 of FIG. 6, discussed above. Accordingly, such computer programs represent controllers of computer system 700. Where an embodiment is implemented using software, the software may be stored in a computer storage medium and loaded into computer system 700 using removable storage drive 714, interface 720, and hard disk drive 712, or communications interface 724.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments.

What is claimed is:

1. A computer-implemented method for creating a scene scan from a group of photographic images comprising:

determining, by at least one computer processor, a set of common features for at least one pair of photographic images from the group of photographic images, the features including at least a portion of an object captured in each of a first and second photographic image included in the at least one pair of photographic images, wherein the first and second photographic images are captured from different optical centers;

determining, by at least one computer processor, a similarity transform for the at least one pair of photographic images, wherein determining the similarity transform includes:

determining a rotation factor between the first and second photographic images, wherein the rotation factor describes a rotation that, when applied to the first or second photographic image, aligns, at least in part, the set of common features between the first and second photographic images;

determining a scaling factor between the first and second photographic images, wherein the scaling factor describes a zoom level that, when applied to the first or second photographic image, aligns, at least in part, the set of common features between the first and second photographic images;

determining a translation factor between the first and second photographic images, wherein the translation factor describes a change in position that, when applied to the first or second photographic image, aligns, at least in part, the set of common features between the first and second photographic images; and providing, by at least one computer processor, the similarity transform in order to render the scene scan from the at least one pair of photographic images, wherein at least one of the rotation factor, the scaling factor, or the translation factor associated with the similarity transform is used to position the first and second photographic images such that the set of common features between the first and second photographic images, at least in part, align;

determining, by at least one computer processor, a counter rotation for the scene scan, the counter rotation based on the rotation factor and a weight factor for each photographic image included in the scene scan, wherein the weight factor for each photographic image is based on a distance of an image center of the photographic image from a center of a viewport;

rendering, by at least one computer processor, the scene scan from the at least one pair of photographic images such that at least the first and second photographic images are positioned to align the set of common features between the first and second photographic images, wherein the set of common features between the first and second photographic images is aligned using at least one of the rotation factor, the scaling factor, or the translation factor;

wherein rendering the scene scan includes applying the counter-rotation, at least in part, to at least one photographic image included in the scene scan, wherein the counter rotation rotates at least the one photographic image in a direction opposite to the rotation factor; and displaying at least a portion of scene scan, wherein the viewport determines the portion of the scene scan that is displayed.

2. The computer-implemented method of claim 1, wherein determining the counter rotation includes determining the counter rotation for a portion of the scene scan included in the viewport.

3. The computer-implemented method of claim 1, wherein rendering scene scan includes maintaining each photographic image included in the scene scan as separate photographic images.

4. The computer-implemented method of claim 1, further comprising:

when an image center of the first photographic image is closest to a center of a viewport used to display the scene scan, positioning the first photographic image over the second photographic image such that the set of common features between the first and second photographic images align; and when the image center of the second photographic image is closest to the center of the viewport used to display the scene scan, positioning the second photographic image over the first photographic image such that the set of common features between the first and second photographic images align.

5. The computer-implemented method of claim 1, further comprising:

positioning each photographic image in the scene scan such that the photographic image with an image center closest to a center of a viewport is placed over the photographic image with the image center next closest to the center of the viewport, wherein the viewport is used to display at least a portion of the scene scan.

6. The computer-implemented method of claim 1, wherein the set of common features includes at least two features captured in the first and second photographic images.

7. A computer system for creating a scene scan from a group of photographic images comprising:

a computing device having one or more computer processors, the one or more computer processors, during operation, implementing:

a feature detector module configured to determine a set of common features for at least one pair of photographic images from the group of photographic images, the features including at least a portion of an object captured in each of a first and second photographic image included in the at least one pair of photographic images, wherein the first and second photographic images are captured from different optical centers;

a similarity transform module configured to determine a similarity transform for the at least one pair of photographic images, the similarity transform determined by:

determining a rotation factor between the first and second photographic images, wherein the rotation factor describes a rotation that, when applied to the first or second photographic image, aligns, at least in part, the set of common features between the first and second photographic images;

determining a scaling factor between the first and second photographic image, wherein the scaling factor describes a zoom level that, when applied to the first or second photographic image, aligns, at least in part, the set of common features between the first and second photographic images; and determining a translation factor between the first and second photographic image, wherein the translation factor describes a change in position that, when applied to the first or second photographic image, aligns, at least in part, the set of common features between the first and second photographic images;

a data output module configured to output the similarity transform in order to render the scene scan from the at least one pair of photographic images, wherein at least one of the rotation factor, the scaling factor, or the translation factor associated with the similarity transform is used to position the first and second photographic images such that the set of common features between the first and second photographic images, at least in part, align;

a counter-rotation module configured to determine a counter rotation for the scene scan, the counter rotation based on the rotation factor and a weight factor for each photographic image included in the scene scan, wherein the weight factor for each photographic image is based on a distance of an image center of the photographic image from a center of a viewport; and a rendering module configured to render the scene scan from the at least one pair of photographic images such that at least the first and second photographic images are positioned to align the set of common features between the first and second photographic images, wherein the set of common features between the first and second photographic images is aligned using at least one of the rotation factor, the scaling factor, or the translation factor;

wherein the rendering module is further configured to apply the counter-rotation, at least in part, to at least one photographic image included in the scene scan, wherein the counter rotation rotates at least the one photographic image in a direction opposite to the rotation factor; and a user-interface module configured to display at least a portion of the scene scan, wherein the viewport determines the portion of the scene scan that is displayed.

8. The computer system of claim 7, wherein the counter rotation module is further configured to determine the counter rotation for the portion of the scene scan included in the viewport.

9. The computer system of claim 7, wherein the rendering module is further configured to maintain each photographic image included in the scene scan as separate photographic images.

10. The computer system of claim 7, wherein:

when an image center of the first photographic image is closest to a center of a viewport used to display the scene scan, the user-interface module is configured to position the first photographic image over the second photographic image such that the set of common features between the first and second photographic images align; and when the image center of the second photographic image is closest to the center of the viewport used to display the scene scan, the user-interface module is configured to position the second photographic image over the first photographic image such that the set of common features between the first and second photographic images align.

11. The computer system of claim 7, wherein:

the user-interface module is further configured to position each photographic image in the scene scan such that the photographic image with an image center closest to a center of a viewport is placed over the photographic image with the image center next closest to the center of the viewport, wherein the viewport is used to display at least a portion of the scene scan.

12. The computer system of claim 7, wherein the set of common features includes at least two features captured in the first and second photographic images.

13. A computer-implemented method for creating a scene scan from a group of photographic images, the group of photographic images organized according to a time value associated with each photographic image that indicates when each photographic image was captured, the method comprising:

determining, by at least one computer processor, a set of common features between two photographic images, the two photographic images including a most recently captured photographic image and a previously captured photographic image, wherein the features include at least a portion of an object captured in each of the two photographic images, and wherein each of the two photographic images are captured from different optical centers;

determining, by at least one computer processor, a rotation factor between the two photographic images, wherein the rotation factor describes a rotation that, when applied to at least one of the two photographic images, aligns, at least in part, the set of common features between the two photographic images;

determining, by at least one computer processor, a scaling factor between the two adjacent photographic images, wherein the scaling factor describes a zoom level that, when applied at least one of the two photographic images, aligns, at least in part, the set of common features between the two photographic images;

determining, by at least one computer processor, a translation factor between the two photographic images, wherein the translation factor describes a change in position that, when applied to at least one of the two photographic images, aligns, at least in part, the set of common features between the two photographic images;

determining, by at least one computer processor, a counter rotation for the scene scan, the counter rotation based on the rotation factor and a weight factor for each photographic image included in the scene scan, wherein the weight factor for each photographic image is based on a distance of an image center of the photographic image from a center of a viewport;

rendering, by at least one computer processor, the scene scan from the group of photographic images such that each two photographic images are positioned to align the set of common features between each two photographic images, the alignment determined by using at least one of the rotation factor, the scaling factor, or the translation factor between each two photographic images;

rendering the scene scan from the two photographic images such that a first and a second photographic image are positioned to align the set of common features between the first and second photographic images, wherein the set of common features between the first and second photographic images is aligned using at least one of the rotation factor, the scaling factor, or the translation factor;

wherein rendering the scene scan includes applying the counter-rotation, at least in part, to at least one photographic image included in the scene scan, wherein the counter rotation rotates at least the one photographic image in a direction opposite to the rotation factor; and displaying at least a portion of scene scan, wherein the viewport determines the portion of the scene scan that is displayed.

14. The computer-implemented method of claim 13, further comprising:

positioning each photographic image in the scene scan such that the photographic image with an image center closest to a center of a viewport is placed over the photographic image with the image center next closest to the center of the viewport, wherein the viewport is used to display at least a portion of the scene scan.

\* \* \* \* \*